United States Patent [19]

Heyse et al.

[11] Patent Number: 4,746,391
[45] Date of Patent: May 24, 1988

[54] APPARATUS FOR CONTINUOUS WELDING OR SEALING OF SEAMS OF PLASTIC FILMS

[75] Inventors: Klaus Heyse, Bad Soden; Ludwig Klenk, Hallgarten, both of Fed. Rep. of Germany

[73] Assignee: Hoechst Aktiengesellschaft, Frankfurt am Main, Fed. Rep. of Germany

[21] Appl. No.: 936,384

[22] Filed: Dec. 1, 1986

[30] Foreign Application Priority Data

Nov. 29, 1985 [DE] Fed. Rep. of Germany ....... 3542256

[51] Int. Cl.⁴ .................. B32B 31/08; B32B 31/20; B31B 21/60
[52] U.S. Cl. ................... 156/359; 156/438; 156/467; 156/498; 156/555; 156/582; 156/583.5
[58] Field of Search .............. 156/359, 438, 467, 498, 156/555, 582, 583.1, 583.5

[56] References Cited

U.S. PATENT DOCUMENTS

| | | | |
|---|---|---|---|
| 2,148,884 | 2/1939 | Walter | 93/94 |
| 2,285,263 | 6/1942 | Fitch | 93/82 |
| 2,556,008 | 6/1951 | Spalding | 156/582 |
| 2,856,742 | 10/1958 | Ballard | 53/177 |
| 3,208,898 | 9/1965 | Chavannes | 156/555 |
| 3,257,257 | 6/1966 | Karsten et al. | 156/498 |
| 3,314,591 | 4/1967 | Cheeley | 229/53 |
| 3,829,341 | 8/1974 | Rothstein | 156/582 |
| 4,057,456 | 11/1977 | Renegar | 156/515 |
| 4,216,638 | 8/1980 | Yoshida | 156/466 |
| 4,401,135 | 8/1983 | Andrae et al. | 138/118.1 |
| 4,478,670 | 10/1984 | Heyse et al. | 156/380.1 |

FOREIGN PATENT DOCUMENTS 2423321 11/1975 Fed. Rep. of Germany .
2907849 9/1979 Fed. Rep. of Germany .

*Primary Examiner*—Donald E. Czaja
*Assistant Examiner*—J. Davis
*Attorney, Agent, or Firm*—Foley & Lardner, Schwartz, Jeffery, Schwaab, Mack, Blumenthal & Evans

[57] ABSTRACT

A flat film 11 is delivered from a supply roll 12 to a folding device with a tube forming part 17 and is folded into a tube envelope 23. The butt or overlap seam of the folded tube envelope 23 is covered with a sealing strip 14. The folded tube envelope 23 together with the sealing strip 14 is guided between a partial periphery of a sealing drum 2 and an electrically heated heating band 3 and is sealed under heat and pressure applied by the heating band 3. Electrical current is supplied to the endlessly revolving heating band 3 via feed rollers 6 and 7 from a current source 20 connected, via lines 21 and 22, to sliding contacts 8 which rest against the two sides of each feed roller. An endlessly revolving, cooled steel band 26 is in contact with the seam of the sealed tube envelope 18 and is guided around a cooling roller 9. The sealed tube envelope 18 is detached from the sealing drum 2 in the region of the cooling roller 9, and is guided over the cooling roller 9 and a deflecting roller 10 onto a wind-up roll 19.

17 Claims, 3 Drawing Sheets

APPARATUS FOR CONTINUOUS WELDING OR SEALING OF SEAMS OF PLASTIC FILMS

BACKGROUND OF THE INVENTION

The invention relates to an apparatus for the continuous welding or sealing of seams of plastic films, which includes supply rolls for flat films and for at least one sealing strip.

Continuously operating film-welding or sealing machines use continuous heated steel bands. They are employed in packaging technology, for example, for sealing head seams on filled plastic pouches or bags in a continuous operation.

In a welding and sealing machine known in the state of the art, two endless steel bands are guided respectively over two deflecting or tensioning rollers. The bands are arranged in such a way that they touch one another and overlap over their entire surface in one of the tensioned sections between two tensioning rollers. The bands are driven in the same direction by means of the rollers and convey the films located between them.

For heating the film to the sealing temperature and for exerting a sealing pressure, fixed, continuously heated heating elements slide on the rear sides of the conveying steel-band sections in the conveying direction. As a result of thermal conduction via the steel bands, the sealing heat is transmitted to the films to be sealed or welded to one another.

Sealing and welding can be matched to a particular film by varying the temperature and the pressing force of the heating elements, the conveying speed of the steel bands and the length of the heating zone.

However, serious disadvantages arise because of the high sliding friction between the heating elements and the steel bands. The sliding friction leads to wear and causes abrasion. Additionally, higher sealing speed cannot be maintained in continuous operation. Another disadvantage is uneven specific distribution of the sealing pressure. This is a result of the warping of the heat-transmitting sliding faces, which occurs because of thermal expansion in the heating elements, which may, for example, be in the form of heating jaws. This also results in an uneven temperature distribution in the individual steel bands because of differing heat transfer resistances between the heating jaws and the steel band.

On the whole, the known welding and sealing machines are not suitable for the reliable production of high-standard welding or sealing seams at relatively high sealing speeds in continuous operation.

Published European Patent Application No. 0 080 120 makes known an apparatus for producing a tube from a flat film web, at the same time forming a longitudinal seam. This apparatus comprises a forming body with an inner bore of essentially circular cross-section, for supporting the formed tube externally in the region of the mutual overlapping of the marginal zones of the web; and a circular-cylindrical inner mandrel for supporting the formed tube internally. Furthermore, for guiding and spacing the web edges of the film web, there is a flexible strip which has a bent cross-section and a curvature which can be matched to the tube periphery, with one or two projecting borders on the longitudinal edges. The tubes produced by means of this apparatus are generally sealed on a welding and sealing machine operating intermittently, such as is described above as being known in the art. Because of the intermittent sealing, the working speed of sealing machines of this type is low, and is approximately 10 m of tube per minute.

To produce a tube from a flat film web, folding aids, such as forming shoulders or forming heads, as described in German Offenlegungsschrift No. 3,013,320, are conventionally used. These bend and fold the web so that they form a longitudinal seam, along which bonding is effected. The two marginal zones can also be connected to one another by means of a film strip—a so-called sealing strip—and it is sufficient for the marginal zones to butt against one another without overlapping.

U.S. Pat. No. 2,148,884 describes an apparatus which uses for support a mandrel arranged inside the formed tube, while a roller is pressed against the tube from outside. These folding aids do not guarantee exact guidance of the overlapping marginal zones of the web, so that the tube formed does not have a uniform periphery.

The forming device known from U.S. Pat. No. 2,856,742 has two forming parts which are located opposite one another and which each come arcuately up against one marginal zone of the web from the outside. The two forming parts are arranged at a distance from one another in the direction of the tubular web and are therefore unsuitable for those webs in which an adhesive is coated on one marginal zone before the forming of the tube. The overlapping marginal zones are only separated from one another in the region between the two forming parts, so that there is danger that the marginal zones will bond to one another even before they pass the first forming part.

U.S. Pat. No. 2,285,263 describes a device for tube formation in which the web is supported from inside and outside and is guided at its margins. The web is supported externally by a curved steel body which brings the web margins towards one another in a helical fashion. The web material is subjected to severe mechanical stress here, since during the formation of the tube the web is forced by the metal body to assume a predetermined form even before the overlapping of its margins.

SUMMARY OF THE INVENTION

It is therefore an object of the present invention to provide an apparatus which is capable of maintaining substantially higher welding and sealing speeds then known apparatuses.

Another object of the present invention is to make it possible to continuously produce welding and sealing seams on plastic films, respectively making it possible to produce tubes from weldable and sealable plastics.

It is also an object of the invention to provide an improved method for making sealed seams, using the apparatus according to the invention.

In accomplishing the foregoing objects, there has been provided according to the present invention an apparatus for the continuous welding or sealing of seams of plastic films comprising a rotatable sealing drum; means for supplying a plurality of plastic film edges to the sealing drum in an overlap or butt seam arrangement; means for guiding the plastic film over a partial periphery of the sealing drum; means for supplying a sealing strip, and for positioning the sealing strip so as to cover the overlap or butt seam of the plastic film edges; at least one endless heating band; means, including a plurality of deflecting/tensioning rollers, for pressing the endless heating band radially against the partial periphery of the rotating sealing drum; and means for heating the endless heating band.

Further objects, features and advantages of the present invention will become apparent from the detailed description of preferred embodiments that follows, when considered together with the attached figures of drawing.

DETAILED DESCRIPTION OF PREFERRED EMBODIMENTS

Figure 1:
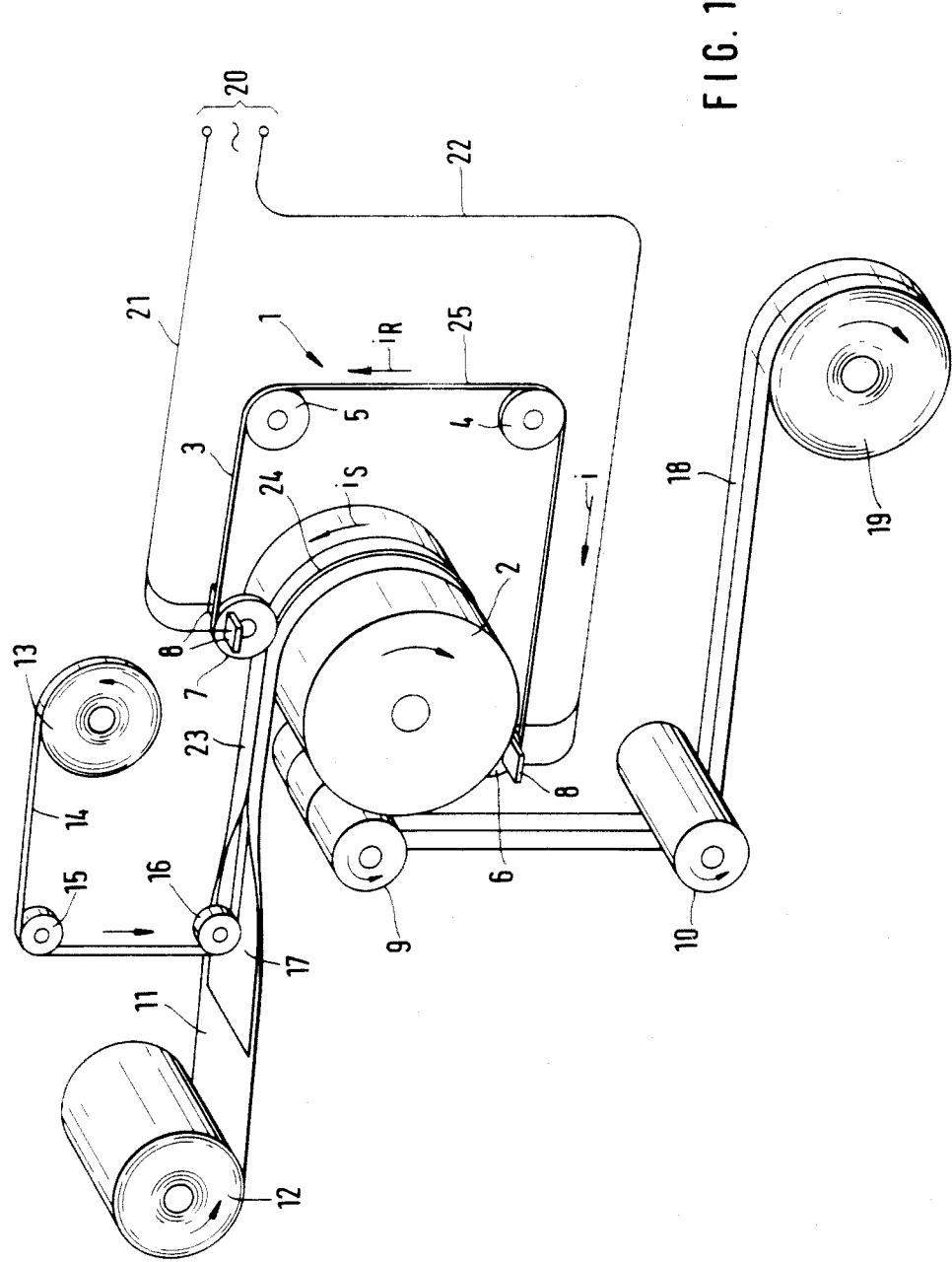
FIG. 1 shows a diagrammatic perspecitve view of an apparatus with a sealing drum for a single sealing web, according to the invention.

According to the invention, there is provided an apparatus in which flat films laid on top of one another, or at least one flat film folded to form a tube envelope, together with a sealing strip covering the overlap seam or butt seam, are guided over a part periphery of a sealing drum. At least one endless heating band, the width of which covers the overlap or butt seam, is pressed radially against the part periphery of the rotating sealing drum by means of deflecting and tensioning rollers.

In one embodiment of the present invention, feed rollers supplying electrical current for the resistance heating of the heating band rest against the part periphery of the sealing drum. Sliding contacts are provided on the feed rollers for supplying the required electrical current. For the purpose of welding or sealing, the films, which are laid on top of one another and which overlap in the region of their longitudinal edges, or plastic film web prefolded to form the tube, are run between the heating band heated by electrical resistance and the sealing drum.

Preferably, the heating band consists of alloyed steel and loops round the sealing drum at an angle of between 180° and 270°. One feed roller rests against the part periphery at the initial point of the latter and the other feed roller rests against the part periphery of the sealing drum at a point corresponding to a looping angle of the heating band of between 180° and 210°. After welding or sealing, the seam region of the tube envelope which rests against the periphery of the sealing drum is cooled by a steel band.

For cooling the sealed tube envelope, a cooling roller rests against the sealing drum at the end point of the part periphery, and the sealed tube envelope is guided over the cooling roller after being detached from the sealing drum.

The invention is explained in detail below with reference to two exemplary embodiments illustrated in the drawings.

The sealing apparatus 1 illustrated in FIG. 1 comprises a sealing drum 1 or sealing roller 2; a heating band 3, which is guided over deflecting and tensioning rollers 4 and 5 and over feed rollers 6 and 7 for electrical current and which rest under pressure against a part periphery of the sealing drum 2; and sliding contacts 8 which are attached on both sides of the feed follers 6 and 7. Also resting against the sealing drum 2 is a cooling roller 9, around which is guided a steel band of a cooling decive which is not shown in FIG. 1. Details of this cooling device emerge from FIG. 2 which will be described in more detail below.

The feed rollers 6 and 7 are mounted so as to be electrically insulated from the machine frame and are equipped with sliding carbon brushes 8 which rest against each feed roller 6 and 7. The brushes 8 are connected to a current source 20 via electrical supply lines 21 and 22. The current source 20 can be, for example, a variable transformer, and the current flow through the heating band 3 to reach the necessary band temperature can be regulated by means of the voltage supplied by the current source 20. From the feed rollers 6 and 7, the total supplied current i divides into two part currents, namely a sealing-strand current $i_S$ and a return-strand current $i_R$. The sealing-strand current $i_S$ electrically heats the sealing strand 24 of the heating band 3, which has a specific ohmic resistance in parallel with the ohmic resistance of the return strand 25 of the heating band 3. By adjusting the lengths of the sealing strand 24 and return strand 25 of the heating band 3, it is possible to vary the ohmic resistances of the two strands and thus coordinate the heating in the two strands of the heating band 3 relative to one another. In this way excessive heating of the return strand 25, in which there is no heat dissipation apart from thermal radiation, is avoided and consequently damage to a heating-band coating such as an anti-adhesive, if appropriate, as a result of this overheating is prevented. The heating band 3 heated by electrical resistance applies both the heat and the necessary sealing pressure to the tube envelope 23 to be sealed. The heating band 3 preferably comprises alloyed steel, in particular a steel/chromium/nickel alloy of relatively high electrical resistance. The heating band 3 loops around the sealing drum 2 at an angle preferably between 180° and 270°, one feed roller 7 resting agains the part periphery of sealing drum 2 at the initial point of contact between drum 2 and heating band 3; the other feed roller 6 rests against the part periphery of the sealing drum 2 at a point corresponding to a looping angle of the heating band 3 of between 180° and 210°. The positions of the two feed rollers 6 and 7 on the part periphery of the sealing drum 2 can be fixed, in which case the ohmic resistances of the sealing strand 24 and return strand 25 of the heating band 3 can be relative to one another solely as a result of the adjustment of the length of the return strand 25 in order to prevent damage to the heating-band caused by overheating.

It is also possible, although not shown in the drawing, to adjust the position of one or both of the feed rollers 6 and 7 along the part periphery of the sealing drum 2, in order to vary the lengths of the sealing stream 24 and return strand 25 of the heating band 3, thus setting the electrical resistance and heating in the return strand 25 so that there is no damage to the heating band as a result of overheating.

A cooling roller 9 rests against the sealing drum 2 at the end point of the part periphery at which the sealed tube envelope 18 is detached from the sealing drum 2. After being detached, the sealed tube envelope 18 is guided over the cooling roller 9.

The starting material for producing the sealed tube envelope 18 is a flat film 11 which is arranged as a reel on a supply roll 12. The flat film 11 is delivered from the reel of the supply roll 12, via a web-edge control (not shown) where appropriate, into a folding device of which a tube forming part 17 is indicated diagrammatically in FIG. 1. In the folding device, the web edges of the flat film 12 are made to butt against one another or are shaped with overlapping into the envelope 23. Details of a folding device of this type are to be found, for example, in the published European Patent Application No. 0 080 120 filed by the same applicant as the present application.

A supply roll 13 for sealing strip 14 is located above the web of the folded or formed tube envelope 23 which lies flat after leaving the folding device. The sealing strip 14 is brought from the reel of the supply roll 13 into contact with the prefolded tube envelope 23 via deflecting rollers 15 and 16, laid flat, and together they are delivered to the sealing drum 2. The sealing strip 14 covers the overlap or butt seam of the folded tube envelope 23. After passing through the folding device, the prefolded tube envelope 23, together with the sealing strip 14 placed in position over the butt seam, is passed through between the sealing drum 2 and the heating band 3. As a result of the heat and pressure of the heating band 3, the folded tube envelope 23 is sealed to the sealing strip 14 to form a sealed tube envelope 18.

Where tube envelopes 23 are to be sealed with an overlap, it is necessary to have a flat film 11 sealable on both sides, and it must be remembered that the inner face of the folded tube envelope 23 must be prevented from being sealed together by means of appropriate antiadhesive coatings, for example by applying a so-called release lacquer layer to the web margin coming to rest on the inside or to the inner web center of the flat film 11.

On the remaining periphery of the sealing drum 2 between one feed roller 6 and the cooling roller 9 resting against the sealing drum 2, the melted seam material of the sealed tube envelope 18 is solidified by means of the above-mentioned cooling device, which has a continuous cooled steel band. From the cooling roller 9, the sealed tube envelope 18 is wound via a deflecting roller 10 onto the reel core of a winding-on roll 19 and is then delivered for further processing. A flat film 11 sealable on both sides can also be sealed without a sealing strip by means of overlapping web edges. Material composed of a flat film 11, sealable on one side, is generally prefolded to a butt joint and then has to be sealed by means of the sealing strip 14 which is usually made of the same material as the flat film. The heating band 3 is only slightly wider than the sealing strip 14.

Depending on the intended use, the sealing layer, and therefore the sealing strip, can be placed on the inside or on the outside. Where a sealing strip on the inside is concerned, it may be expedient (in order to prevent damage to the sealing layer) to work with anti-adhesive coatings on the rear side of the sealing strip, or on the inner web center over the width of the sealing seam.

It is important to prevent overheating of the heating band 3 especially when, for reasons relating to the sealing process, sealing has to be carried out by means of a heating band 3 having an anti-adhesive coating on the sealing side.

It may also be mentioned that to equip the tube envelope for advertising purposes, the flat film 11, after running off from the reel of the supply roll 12, can be printed by means of so-called "in-line" printing units.

The speed with which the flat film 11 can be processed into the sealed tube envelope 18 depends essentially on the dwell time of the flat film under the heating band and consequently increases with an increasing diameter of the sealing drum.

In practice, the apparatus is operated at sealing or welding speeds of approximately 100 m/min.

Figure 2:
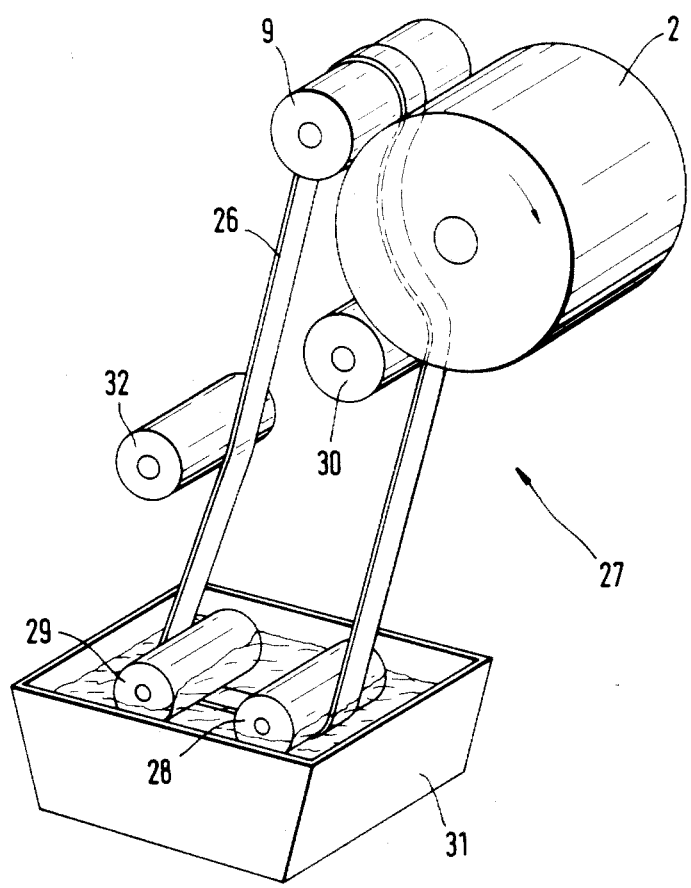
FIG. 2 shows a part view of a cooling device for the overlap or butt seam of the sealed tube envelope or of the plastic films overlapping in the marginal region.

FIG. 2 shows details of the cooling device 27 which has an endlessly revolving steel band 26 which is guided via the cooling roller 9, a tensioning roller 32 and deflecting rollers 28, 29 and 30. The deflecting roller 30 is located near the first feed roller 6 for supplying electrical current to the heating band 3. Arranged underneath the deflecting rollers 28 and 29 is a cooling trough 31 which is filled with water or another suitable cooling fluid. The width of the steel band 26 is slightly larger than the width of the sealing strip 14. The width of the cooling roller 9 corresponds approximately to the width of the sealing drum 2.

Both the steel band 26 and the heating band 3 are carried along as a result of friction over the looping periphery of the silicone-coated sealing drum 2 and do not have their own drive, only the sealing drum 2 being driven.

Figure 3:
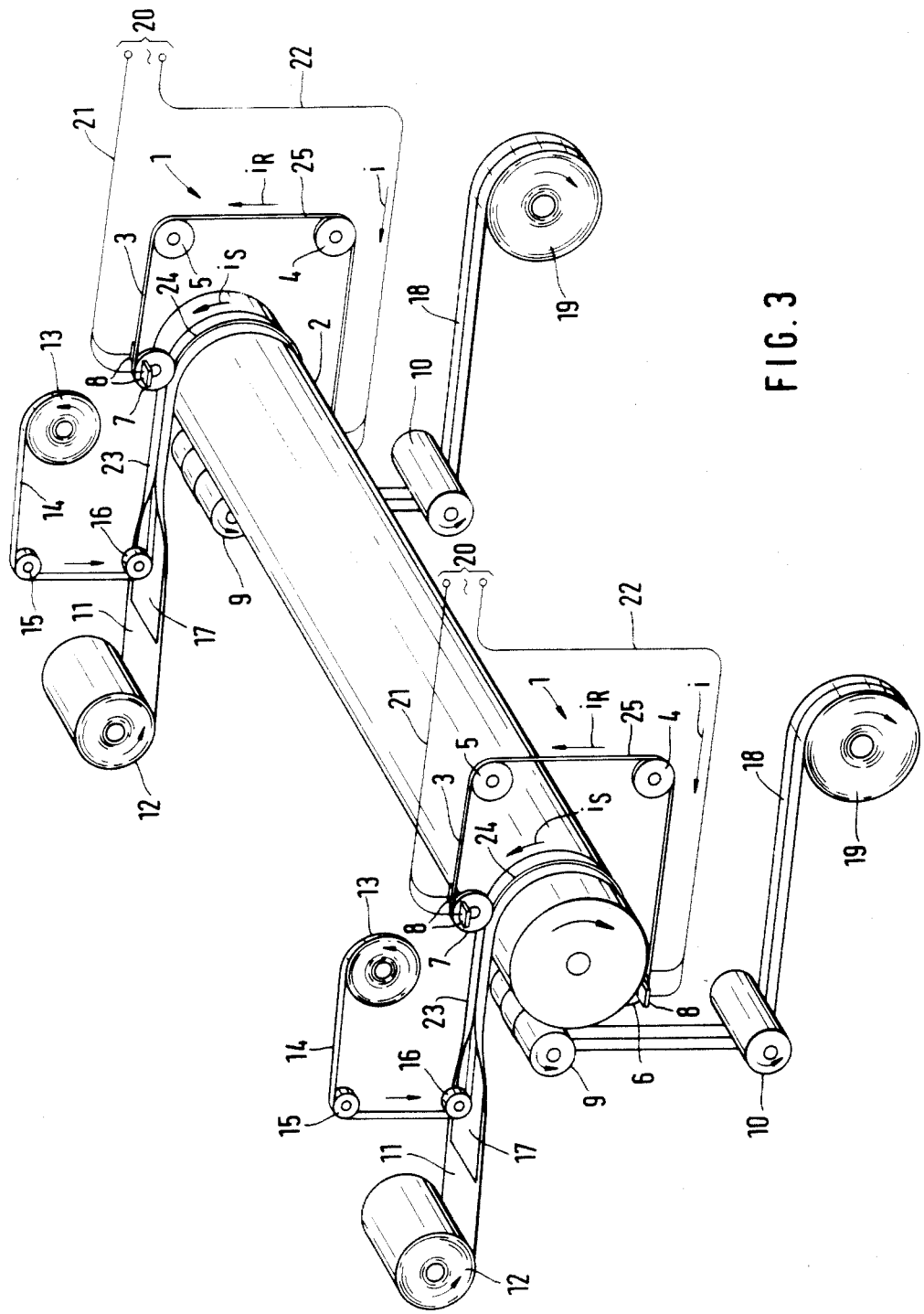
FIG. 3 shows a diagrammatic perspective view, similar to that of FIG. 1, of an apparatus employing several sealing webs.

FIG. 3 shows in a perspective representation, an apparatus for sealing several webs in which the sealing drum 2 is made so wide that, for example, up to six heating bands 3 are accommodated next to one another on the surface of the part periphery of the sealing drum 2. The supply rolls 12 for the flat films 11 are arranged partly above one another and partly next to one another. If sufficient space is available, then all of the supply rolls can be arranged next to one another or above one another. The supply rolls 13 of the sealing strips 14 are arranged similarly to the supply rolls 12 of the flat films 11.

By means of devices (not shown) which are known in the art, the flat films 11 formed into tube envelopes 23 and the sealing webs resting on the butt or overlap seams of te tube envelopes are deflected, lying next to one another, onto the part periphery surface of the sealing drum 2 and guided under the corresponding number of heated heating bands 3 pressed against the part periphery surface. Each heating band 3 is supplied with current from its own current source. As many cooling rollers 9 as there are steel bands 26 guided over the sealed tube envelopes 18 are provided for cooling purposes, the endlessly revolving steel bands running through a common cooling trough 31. The sealed tube envelopes 18 are guided over the cooling rollers 9 to deflecting rollers 10, and from these to winding-on rolls 19.

Although not shown, it is also possible by means of the apparatus according to FIGS. 1 and 3 to seal together flat unfolded plastic film strips along their strip edges butting against one another or overlapping. The only difference in the design of the apparatus in this case is that the folding devices with the tube forming parts are omitted.

What is claimed is:

1. An apparatus for the continuous welding or sealing of seams of plastic films comprising:
   a rotatable sealing drum;
   means for supplying a plurality of plastic film edges to said sealing drum in a contiguous seam arrangement;
   means for guiding said plastic film over a partial periphery of said sealing drum;
   means for supplying a sealing strip, and for positioning said sealing strip so as to cover the seam of said plastic film edges;

at least one endless heating band;

means including a plurality of deflecting/tensioning rollers, for pressing said at least one endless heating band radially against said partial periphery of said rotating sealing drum; and means for heating said at least one endless heating band comprising a plurality of feed rollers for said at least one heating band supplying electrical current for resistance heating of said at least one heating band, said rollers resting against said partial periphery of said sealing drum, the position of one or more of said rollers being adjustable along the partial periphery of said sealing drum in order to vary the lengths of sealing and return strands of said at least one heating band and to set the electrical resistance, whereby the heating ability of said return strand can be controlled to prevent damage as a result of overheating, and at least one sliding contact provided on each of said feed rollers for supplying the electrical current.

2. An apparatus as claimed in claim 1, wherein said means for supplying a sealing strip comprises at least one supply roll.

3. An apparatus as claimed in claim 1, wherein said at least one endless heating band is positioned so as to loop around said sealing drum at an angle of between 180° and 270°, and wherein one of said feed rollers rests against the partial periphery of said sealing drum at the initial point of contact between said sealing drum and said at least one endless heating band, and another of said feed rollers rests against the partial periphery of said sealing drum at a point corresponding to a looping angle of the at least one endless heating band of between 180° and 210°.

4. An apparatus as claimed in claim 1, wherein a cooling roller rests against said sealing drum at the end point of the partial periphery, and wherein a sealed tube envelope is guided over said cooling roller after being detached from said sealing drum.

5. An apparatus as claimed in claim 1, wherein said at least one endless heating band is comprised of alloyed steel.

6. An apparatus as claimed in claim 5, wherein said alloyed steel of said at least one heating band comprises a steel/chromium/nickel alloy.

7. An apparatus as claimed in claim 1, wherein said feed rollers are mounted so as to be electrically insulated relative to said machine frame, and wherein after said feed roller, the total supplied current divides into two part currents, comprising a sealing-strand current and a return-strand current.

8. An apparatus as claimed in claim 1, wherein a sealing side of said at least one heating band includes an anti-adhesive coating.

9. An apparatus as claimed in claim 1, wherein said sliding contacts comprise carbon contact brushes.

10. An apparatus as claimed in claim 9, wherein said carbon contact brushes each rest against the sides of one of said feed rollers and are connected to a current source by a plurality of electrical supply lines.

11. An apparatus as claimed in claim 10, wherein said current source comprises a variable transformer.

12. An apparatus as claimed in claim 1, wherein the width of said sealing drum is selected so that a plurality of heating bands can be arranged next to one another on the peripheral surface of said sealing drum.

13. An apparatus as claimed in claim 1, further comprising, adjacent said sealing drum, a cooling device having one or more endlessly revolving cooling bands which are guided through a cooling trough.

14. An apparatus as claimed in claim 13, wherein said cooling band or bands are guided over at least one cooling roller and rest against the surface of a remaining partial periphery of said sealing drum, between one of said feed rollers and said at least one cooling roller.

15. An apparatus as claimed in claim 14, wherein said cooling band or bands are guided via at least one tensioning/deflecting roller, and wherein one of said tensioning/deflecting rollers rests against said sealing drum, and guides said cooling band or bands horizontally.

16. An apparatus as claimed in claim 15, wherein the cooling trough is arranged underneath said at least one tensioning/deflecting roller.

17. An apparatus as claimed in claim 1, wherein said means for supplying plastic film edges comprises means for supplying one flat film folded into a tube envelope.

* * * * *